United States Patent [19]
Reddig et al.

[11] Patent Number: 5,709,717
[45] Date of Patent: Jan. 20, 1998

[54] PHTHALOCYANINE REACTIVE DYESTUFF MIXTURE

[75] Inventors: Wolfram Reddig, Leverkusen; Karl-Josef Herd; Wolfgang Harms, both of Odenthal, all of Germany

[73] Assignee: Bayer Aktiengesellschaft, Leverkusen, Germany

[21] Appl. No.: 646,185

[22] Filed: May 7, 1996

[30] Foreign Application Priority Data

May 12, 1995 [DE] Germany ............... 195 17 503.4

[51] Int. Cl.$^6$ ............... C09B 62/016; D06P 1/38
[52] U.S. Cl. ............... 8/549; 8/638; 8/661
[58] Field of Search ............... 8/638, 549, 661

[56] References Cited

U.S. PATENT DOCUMENTS

| | | | |
|---|---|---|---|
| 4,711,641 | 12/1987 | Nakamatsu et al. | 8/524 |
| 5,163,971 | 11/1992 | Stawitz | 8/549 |
| 5,356,444 | 10/1994 | Schwarz et al. | 8/638 |
| 5,423,888 | 6/1995 | Hildebrand et al. | 8/532 |

FOREIGN PATENT DOCUMENTS

| | | |
|---|---|---|
| 63110260 | 5/1988 | Japan . |
| 1208553 | 10/1970 | United Kingdom . |
| 1250383 | 10/1971 | United Kingdom . |
| 1296345 | 11/1972 | United Kingdom . |
| 1306738 | 2/1973 | United Kingdom . |
| 1311572 | 3/1973 | United Kingdom . |

*Primary Examiner*—Margaret Einsmann
*Attorney, Agent, or Firm*—Sprung Kramer Schaefer & Briscoe

[57] ABSTRACT

A phthalocyanine reactive dyestuff mixture having improved color levelness and combination properties comprises at least one phthalocyanine-fluoropyrimidinyl reactive dyestuff 2 and at least one phthalocyanine-vinylsulfonyl reactive dyestuff 1 or at least one phthalocyanine-monochlorotriazinyl reactive dyestuff 3, as well as one or more yellow reactive dyestuffs of the formula 4 to 9.

11 Claims, No Drawings

PHTHALOCYANINE REACTIVE DYESTUFF MIXTURE

The invention relates to mixtures of phthalocyanine reactive dyestuffs which, when used for dyeing cellulose fibers or regenerated cellulose fibers, have an improved appearance of the goods compared with the individual components and improved combination properties with reactive yellow dyestuffs when used for producing green dyeings, and to novel dyestuffs.

The appearance of the goods obtained when turquoise dyeings and brilliant green dyeings are produced on fiber materials of natural or regenerated cellulose fiber substrates or on mixtures of such fiber materials with synthetic fiber materials of polyester, polyacrylonitrile or polyamide shows a restriction in levelness which depends very greatly on the fiber material and on the illumination conditions, compared with the levelness of a blue, yellow or red dyeing produced according to the prior art and combination dyeings thereof to give the customary fashionable shades. This restriction in levelness typical of phthalocyanine reactive dyestuffs is called skitteriness in technical terms.

This is understood as meaning a fiber unlevelness, which is based on the fact that the cellulose fibers combined in the group of fibers show a different uptake of the dyestuff, which manifests itself in an uneven appearance of the goods, depending on the angle of observation. The so-called skitteriness of phthalocyanine dyeings is particularly significant and is intensified when these are used for dyeing green shades, i.e. in the combined use of phthalocyanine reactive dyestuffs and pyridone and pyrazolone azo reactive dyestuffs. A number of processes have been described for overcoming the skittery dyeing of phthalocyanine reactive dyestuffs, in order in particular to improve the uniformity of the dyeing of the individual fibers by the phthalocyanine reactive dyestuff by addition of auxiliaries to the dyebath or by formation of the lithium salts of the phthalocyanine reactive dyestuffs in the dyebath. However, this method has the disadvantage that the wastewater of the dyeing is additionally concentrated in fiber swelling agents or dyestuff solvents, the ecological acceptance of which is limited and removal of which from the wastewaters is associated with high costs.

According to T. A. Konkova and L. I. Belenkij Tekstilnaja Prom. 27, 4, 66–68 (1967), there are severe objections to binary mixtures of different reactivity and substantivity of the dyestuffs in respect of unlevelness and uncertainty of the color shade.

If phthalocyanine reactive dyestuffs are used by the padding process for producing turquoise dyeings or brilliant green dyeings on fiber materials of natural or regenerated cellulose fiber substrates or on mixtures of such fiber materials with synthetic fiber materials of polyester or polyamide, an appearance of the goods is obtained which shows a restriction in levelness which depends greatly on the fiber material and on the illumination conditions, compared with the levelness of a blue, yellow or red dyeing produced in accordance with the prior art and combination dyeings thereof to give customary fashionable shades. This restriction in levelness typical of phthalocyanine reactive dyestuff is based on the different fixing properties of a phthalocyanine dyestuff on the natural and regenerated cellulose fibers.

This is particularly significant in the presence of a yellow dyestuff which shows different padding and fixing properties.

The breaking up of a turquoise-green mixture when used for dyeing by the padding process is known both for cotton and for regenerated cellulose fibers. The dyeings obtainable when dyeing with copper phthalocyanine dyestuffs in combination with yellow azo dyestuffs show the problem of fiber unlevelness (skitteriness) and of tailing (shift in shade due to preferential uptake of turquoise from the padding trough).

During padding, the phthalocyanine dyestuff is preferentially taken up from the chassis. In the cold pad-batch process, the material is subsequently wound onto large rolls, so that the portion padded first is stored inside the wound goods. During the subsequent washing process, however, the outer layer is first fed to the continuous washing unit. The inner portion of the wound goods is therefore stored for longer.

With the great differences in the speed of fixing of the turquoise and yellow content, an additional shift in color must therefore occur during batching if the turquoise content is fixed more slowly than the yellow content, i.e. with the batching times customary in practice for the wound goods, at the end of the fixing process with the green dyeings known to date there is often a difference in the fixing bath of yellow and turquoise between the inner and outer layers of a wound-up textile material. As a result, during rinsing of the dyeing, more turquoise is washed out from the outer layers than from the inner layers.

A number of processes for overcoming the slow fixing properties of phthalocyanine reactive dyestuffs have been described, in order in particular to improve the uniformity of the dyeing of the individual fibers by the phthalocyanine reactive dyestuff and the tendency to tail by addition of auxiliaries to the padding bath. However, this method has the disadvantage that the wastewater of the dyeing is additionally concentrated with fiber swelling agents or dyestuff solvents, the ecological acceptance of which is limited and the removal of which from the wastewaters is associated with high costs.

The invention is based on the object of providing phthalocyanine reactive dyestuff mixtures for producing turquoise and green dyeings which, with a good fixing yield under dyeing conditions appropriate in practice, produce an improved appearance of the goods compared with the individual dyestuffs, and are suitable in particular for the reactive pad dyeing process, in which the residual and rinsing liquors should be free from AOX.

The dyestuff mixture should have a high solubility and insensitivity to electrolytes and show dyeing properties which are constant in shade in the course of time, level over the surface and reproducible under variable temperature, alkali and liquor conditions.

The present invention relates to a dyestuff mixture of at least two phthalocyanine reactive dyestuffs which contain a different reactive group, which comprises at least one chlorine-free phthalocyanine-fluoropyrimidinyl reactive dyestuff 2 and at least one phthalocyanine-vinylsulfonyl reactive dyestuff 1 and/or one phthalocyanine-monochlorotriazinyl reactive dyestuff 3.

The invention furthermore relates to a padding process using a mixture of phthalocyanine reactive turquoise blue dyestuffs in combination with a mixture of yellow reactive dyestuffs for dyeing cellulose fibers or regenerative cellulose fibers which shows an improved appearance of the goods compared with the use of the individual components.

The invention furthermore relates to novel phthalocyanine-fluoropyrimidinyl reactive dyestuffs 2. These are particularly suitable for the mixture according to the invention.

Surprisingly, it has been found that the levelness of the appearance of the goods of phthalocyanine reactive dyeings on cellulose fibers can be achieved by mixtures of different phthalocyanine reactive dyestuffs, in particular by mixtures of phthalocyanine reactive dyestuffs which contain different reactive groups, instead of by addition of auxiliaries.

Preferred dyestuffs 1 are:

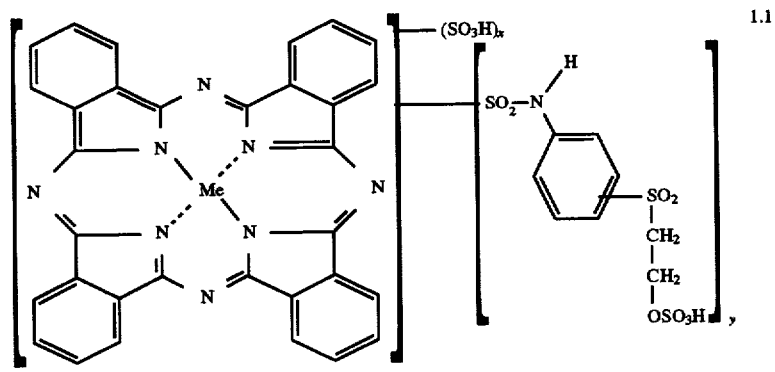

1.1 in which

Me=a metal atom, x=1 to 3, in particular 1.5 to 2, y=1 to 3, in particular 1 to 2, especially 1.3 to 1.8, and x+y=about 3 to 4, for example of the structure 1.2:

$x=0.8$ to $1.5$ $y=0.2$ to $0.5$

Me'=Cu or Ni

In a preferred embodiment of the compound 1.1, the radical —$SO_2$—$CH_2$—$CH_2$—$OSO_3H$ is in the p-position.

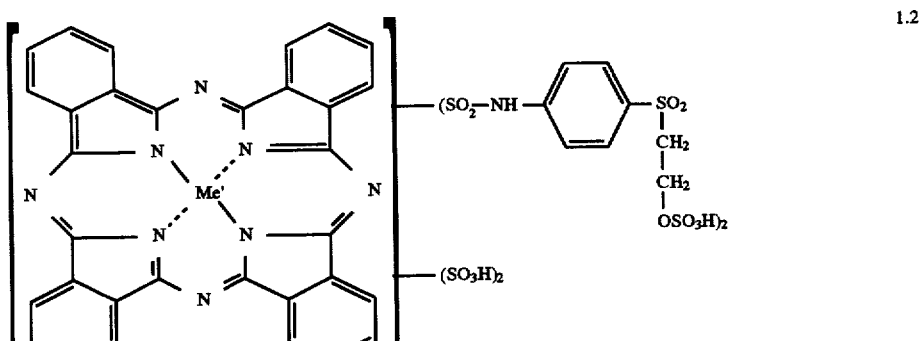

1.2

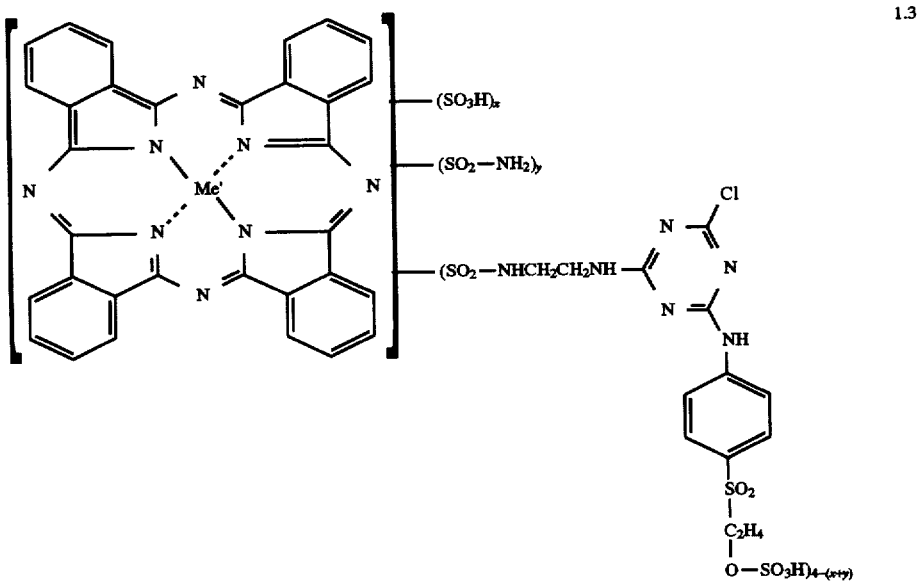

1.3 where

Preferred dyestuffs 2 correspond to the formula:

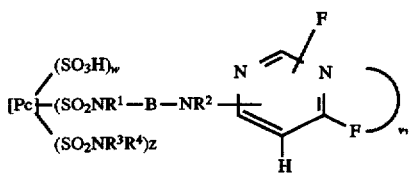  (2a)

in which

Pc=the radical of a copper phthalocyanine or nickel phthalocyanine,

B=an optionally substituted arylene, aralkylene or optionally substituted alkylene bridge or a direct bond, $R^1$, $R^2$, $R^3$, $R^4$=independently of one another hydrogen or an optionally substituted alkyl or aryl radical, and in which —$NR^1$—B—$NR^2$— can also be

and

—$NR^3R^4$ can also be

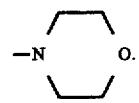

w, z=independently of one another a number from 0 to 3 v=a number from 0.5 to 2.0, in particular 0.8 to 1.5.

Preferably, w+v+z=3.0 to 4.0.

Preferred arylene, aralkylene and alkylene bridges B are o-, m- and p-phenylene, o-, m- or p-phenylene which is substituted by $CH_3$, $SO_3H$ or $CO_2H$, ethylene, propylene, —$CH_2$—$CH(CH_3)$—, —$(CH_2)_4$—, —$(CH_2)_5$—,

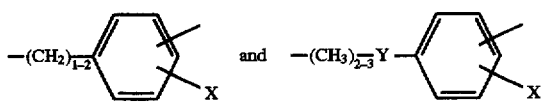

in which

X=H, $CH_3$, $CO_2H$ or $SO_3H$

Y=O, S or $NR^1$.

Preferred alkyl radicals $R^1$ to $R^4$ are $C_1$–$C_4$-alkyl or $C_1$–$C_4$-alkyl radicals which are substituted by OH, $SO_3H$, $OSO_3H$ or $CO_2H$.

Preferred aryl radicals $R^1$ to $R^4$ are phenyl and phenyl radicals which are substituted by OH, $SO_3H$ or $CO_2H$.

Especially preferred dyestuffs are those of the formulae 2.1, 2.2 and 2.3

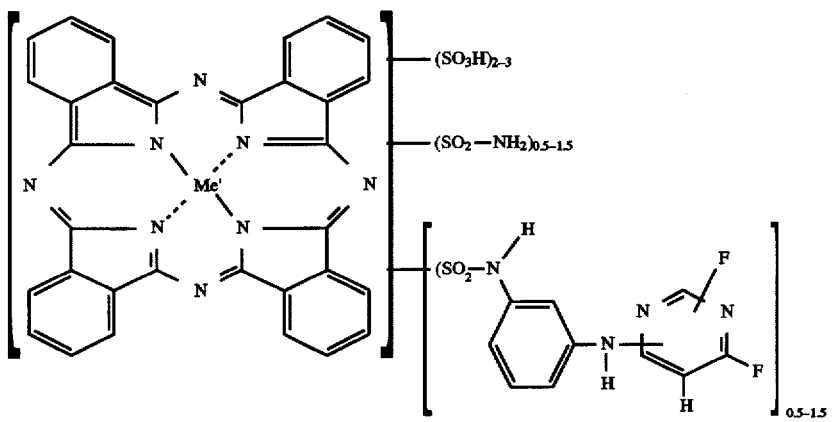

2.1

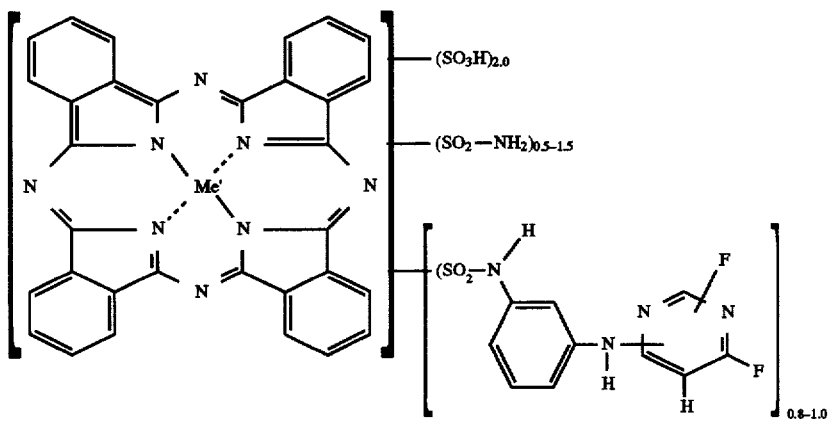

2.2

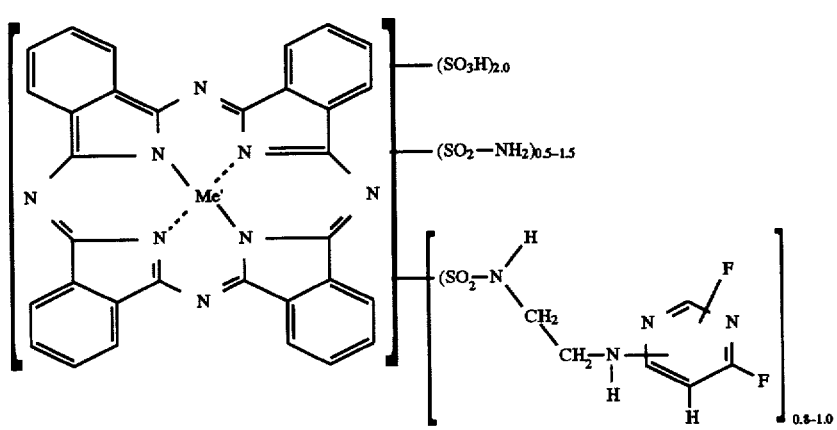
2.3
Me'=Cu or Ni.
Preferred dyestuffs 3 are:
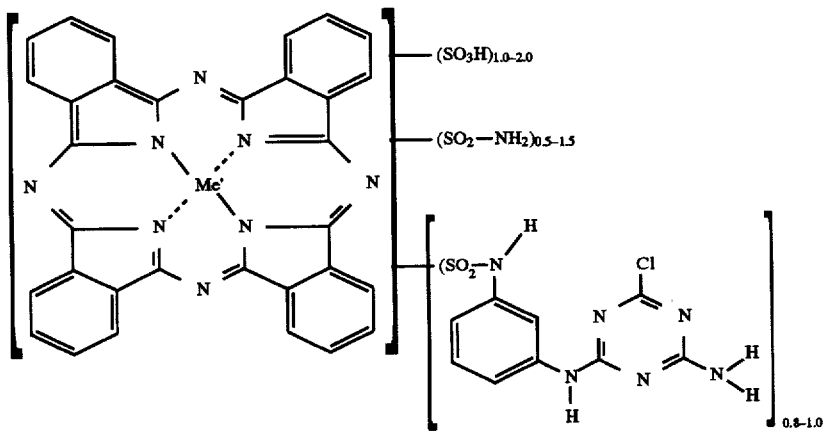
3.1
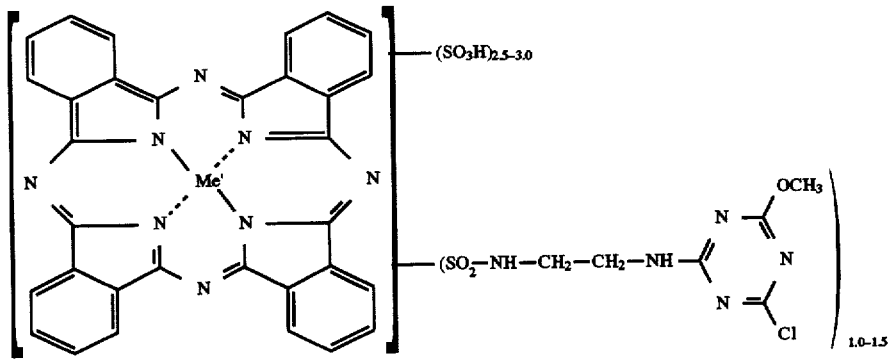
3.2
Me'=Cu or Ni,
the number stated for the substituents in each case being statistical mean values.
In a preferred embodiment, the mixture additionally comprises a reactive dyestuff yellow mixture of the dyestuffs 4, 5 or 6 and the dyestuff 7, 8 or 9 of the structures shown below:

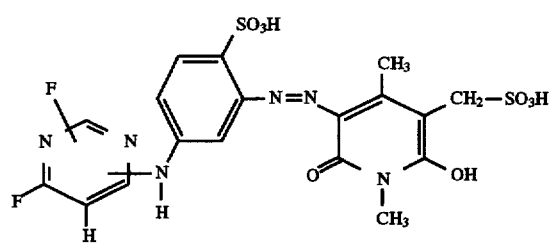
4
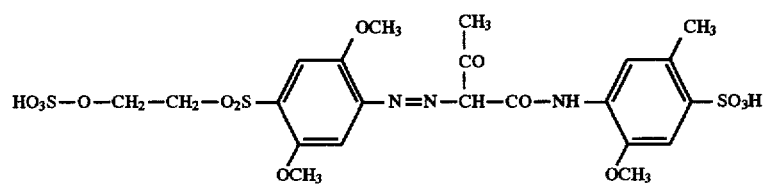
5
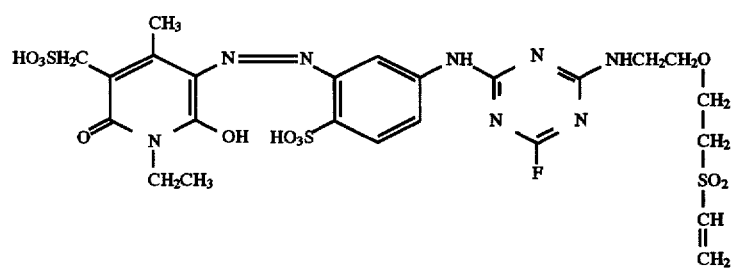
6
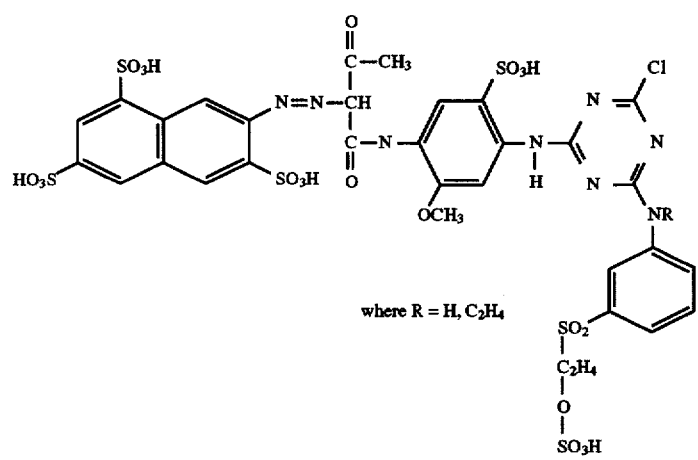
7
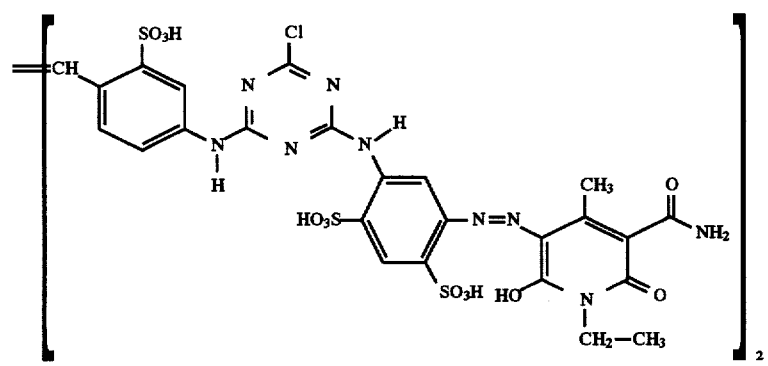
8

-continued

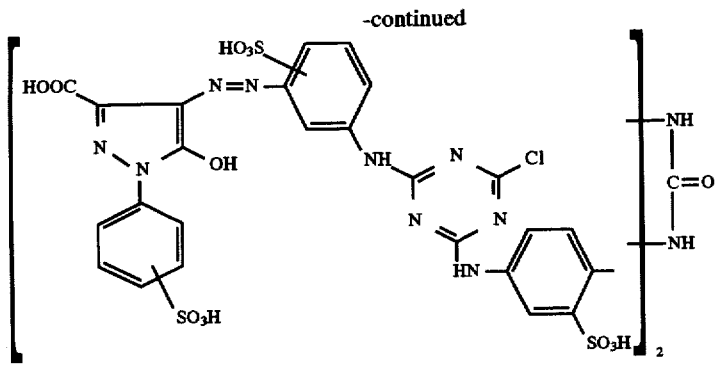

Surprisingly, it has also been found that the levelness of the appearance of the goods of phthalocyanine reactive pad dyeings on cellulose fibers can be improved by mixtures of different phthalocyanine reactive dyestuffs, in particular by mixtures of phthalocyanine reactive dyestuffs which contain different reactive groups. It has furthermore been found that the levelness of brilliant green dyeings based on phthalocyanine and brilliant azo yellow reactive dyestuffs can be improved if mixtures of two reactive yellow dyestuffs which likewise contain different reactive groups are used as the yellow content.

The process according to the invention is advantageously suitable for producing brilliant green shades by combined use of a mixture of the dyestuffs 1 and 2 or 2 and 3 with a mixture of the dyestuffs 4, 5 or 6 independently of one another with the dyestuffs 7, 8 or 9.

It has also been found that a substantial improvement in the padding and fixing properties can be achieved in padder application, so that tone-in-tone squeezing off of the padding liquor in the padder and constant-shade fixing in the steamer (pad steam) and in the cold pad-batch process is possible.

Particularly preferred reactive turquoise blue mixtures are:

Mixture 1: dyestuffs 1.1 (x=about 1.5 to 2 and y=about 1.3 to 1.8) and 2.1

Mixture 2: dyestuffs 1.2 and 2.1

Mixture 3: dyestuffs 1.3 and 2.1

Mixture 4: dyestuffs 1.1 (x=about 1.5 to 2 and y=about 1.3 to 1.8) and 2.2

Particularly preferred additional reactive yellow mixtures are:

Mixture 7: dyestuffs 4 and 7

Mixture 8: dyestuffs 4 and 8

Mixture 9: dyestuffs 4 and 9

Mixture 10: dyestuffs 5 and 7

Mixture 11: dyestuffs 5 and 8

Mixture 12: dyestuffs 5 and 9

Mixture 13: dyestuffs 6 and 7

Mixture 14: dyestuffs 6 and 8

Mixture 15: dyestuffs 6 and 9

The mixtures comprise, based on the total dyestuff content:

Dyestuffs 1: 0 to 70, in particular 40 to 55% by weight
Dyestuffs 2: 30 to 70, in particular 45 to 60% by weight
Dyestuff 3: 0 to 70, in particular 0 to 45% by weight
Dyestuff 4: 30 to 70, in particular 50% by weight
Dyestuff 5: 30 to 70, in particular 50% by weight
Dyestuff 6: 30 to 70, in particular 50% by weight
Dyestuff 7: 30 to 70, in particular 50% by weight
Dyestuff 8: 30 to 70, in particular 50% by weight
Dyestuff 9: 30 to 70, in particular 50% by weight Further dyestuffs or customary auxiliaries can additionally be employed. In particular, the dyestuff mixtures according to the invention comprise up to 50 parts of an inorganic salt, such as, for example, sodium chloride or sodium sulfate, per 100 parts of dyestuff. The mixtures according to the invention furthermore preferably comprise a buffer, in particular an inorganic buffer, which produces a buffering range between pH 6.5 to 7.5. For better handling, the mixtures according to the invention preferably comprise dispersing agents, in particular 0.5 to 10 parts by weight of an organic, anionic dispersing agent, based on the total mixture, and a dust removal agent, preferably 0.5 to 5 parts by weight, based on the total mixture.

The dyestuff mixture can preferably be used for dyeing cotton and other cellulose fibers in the cold pad-batch process. Suitable materials are both pure cellulose fiber materials and mixtures thereof with polyester, such as polyester/cotton, polyester/viscose and polyester/linen, and mixtures of various cellulose fibers, such as cotton/viscose staple or cotton/linen. The main field of use of the mixture is dyeing of cotton woven and knitted goods and of terry goods.

Batching temperatures of 20° C. to 30° C. are possible, the preferred batching temperature is 25° C., and the preferred batching temperature is identical to the preferred padding temperature. The short batching time with respect to the depth of color for turquoise and green dyeings is to be emphasized as a technical advance.

In another preferred embodiment, the mixture is used in the pad steam process.

The mixtures according to the invention are particularly suitable for dyeing by the pad process, preferably in accordance with the following standard recipes:

A) Cold pad-batch process
  Standard recipe:
  1. 1000 parts of padding liquor comprise
    1 to 80 parts of dyestuff mixture according to the invention
    50 to 100 parts of water-glass, specific gravity 1.5
    7.5 to 15 parts of sodium hydroxide solution, specific gravity 1.5
    0 to 100 parts of urea
    0 to 2 parts of wetting agent
    0 to 20 parts of thickener
  1000 parts of padding liquor comprise
    1 to 80 parts of dyestuff
    8 to 20 parts of sodium carbonate
    1 to 12 parts of sodium hydroxide solution, specific gravity 1.5

0 to 100 parts of urea 0 to 2 parts of wetting agent 0 to 2 parts of thickener

| liquor pick-up | 50 to 120% |
|---|---|
| padding liquor temperature | 20 to 30° C. |
| batching time | 24 to 48 hours |

B) One-bath pad-steam process with intermediate drying

Standard recipe:

1000 parts of padding liquor comprise 1 to 80 parts of dyestuff mixture according to the invention 1 to 4 parts of wetting agent 5 to 20 parts of thickener 5 to 20 parts of sodium carbonate, anhydrous 0 to 100 parts of urea 3 to 5 parts of m-nitrobenzenesulfonate Process conditions:

| Padding liquor temperature | 20 to 30° C. |
|---|---|
| Liquor pick-up | 50 to 70% |
| Drying time | 1 to 2 hours |
| Drying temperature | 120 to 140° C. |
| Steaming temperature | 102 to 108° C. |
| Steaming time | 1 to 8 minutes |

C) One-bath pad-steam process with intermediate drying

Standard recipe:

1000 parts of padding liquor comprise 1 to 80 parts of dyestuff mixture according to the invention 1 to 4 parts of wetting agent 10 to 20 parts of sodium carbonate, anhydrous, or 10 to 20 parts of sodium bicarbonate/sodium carbonate 50/50

3 to 5 parts of m-nitrobenzenesulfonate

Process conditions:

| Padding liquor temperature | 20 to 30° C. |
|---|---|
| Liquor pick-up | 50 to 70% |
| Steaming temperature | 102 to 108° C. |
| Steaming time | 1 to 8 minutes |

D) Two-bath pad-steam process with intermediate drying

Standard recipe:

1000 parts of padding liquor comprise 1 to 80 parts of dyestuff mixture according to the invention 1 to 4 parts of wetting agent 5 to 20 parts of thickener Chemical padding liquor:

1000 parts of chemical padding liquor comprise 250 parts of sodium chloride 20 to 40 parts of sodium carbonate, anhydrous, and/or 20 parts of sodium hydroxide solution of specific gravity 1.5

Process conditions:

| Padding liquor temperature | 20 to 30° C. |
|---|---|
| Liquor pick-up | 50 to 70% |
| Drying time | 1 to 2 minutes |
| Drying temperature | 120 to 140° C. |
| Liquor pick-up in the chemical padding | 50 to 70% |
| Steaming time | 1 to 8 minutes |
| Steaming temperature | 102 to 108° C. |

E) Two-bath pad-steam process without intermediate drying

Standard recipe:

1000 parts of padding liquor comprise 1 to 80 parts of dyestuff mixture according to the invention 1 to 40 parts of wetting agent Chemical padding liquor 1000 parts of chemical padding liquor comprise 250 parts of sodium chloride 20 to 40 parts of sodium carbonate, anhydrous, and/or 20 parts of sodium hydroxide solution of specific gravity 1.5

Process conditions:

| Padding liquor temperature | 20 to 30° C. |
|---|---|
| Liquor pick-up | 50 to 70% |
| Liquor pick-up in the chemical padding | 20 to 50% |
| Steaming time | 1 to 8 minutes |
| Steaming temperature | 102 to 108° C. |

F) Pad-cure process

Standard recipe:

1000 parts of padding liquor comprise 1 to 40 parts of dyestuff mixture according to the invention 1 to 4 parts of wetting agent 5 to 10 parts of sodium carbonate and/or 5 to 10 parts of sodium bicarbonate 5 to 20 parts of thickener 3 to 5 parts of m-nitrobenzenesulfonate Process conditions:

| Padding liquor temperature | 20 to 30° C. |
|---|---|
| Liquor pick-up | 50 to 70% |
| Drying time | 1 minute |
| Drying temperature | 120 to 140° C. |
| Curing temperature | 140 to 160° C. |
| Curing time | 1 minute |

The mixtures according to the invention are furthermore particularly suitable for dyeing in the exhaustion process, preferably in accordance with one of the following schemes:

A) Dyestuff at start on winch vats

| Time (minutes) | Temperature (°C.) | Measure |
|---|---|---|
| 0 | 60 | Addition of dyestuff |
| 15 | 60 | Addition of salt |
| 45 | 60 | Addition of sodium carbonate |
| 75 | 60 | Start of heating up |
| 105 | 80 | Dyeing |

-continued

| Time (minutes) | Temperature (°C.) | Measure |
|---|---|---|
| 135 | 80 | End of dyeing |
| 145 | 80 | Draining of the dye liquor |
| 165 | 60 | 1st Rinsing bath |
| 185 | 60 | 2nd Rinsing bath |
| 215 | 80 | 3rd Rinsing bath |
| 245 | 80 | 4th Rinsing bath |
| 290 | 95 | Boiling bath |
| 300 | 20 | Cold rinsing, draining |

B) Salt at start on jet dyeing apparatus with a formulating vessel (the salt is added to the dyebath before the dyestuff)

| Time (minutes) | Temperature (°C.) | Measure |
|---|---|---|
| 0 | 30 | Addition of salt or draw in salt brine |
| 15 | 60 | Draw in dyestuff solution |
| 45 | 60 | Draw in alkali solution |
| 75 | 60 | Start of heating up |
| 105 | 80 | Dyeing |
| 135 | 80 | End of dyeing |
| 145 | 80 | Draining of the dye liquor |
| 165 | 60 | 1st Rinsing bath |
| 185 | 60 | 2nd Rinsing bath |
| 215 | 80 | 3rd Rinsing bath |
| 245 | 80 | 4th Rinsing bath |
| 290 | 95 | Boiling bath |
| 300 | 20 | Cold rinsing, draining |

The dyestuff mixture can preferably be used for dyeing cotton and other cellulose fibers in the exhaustion process on customary dyeing units.

Dyeing temperatures of 60° C. to 95° C. are possible, the preferred dyeing temperature is 80° C. and the preferred start temperature is 60° C.

The invention also relates to phthalocyanine reactive dyestuffs of the formula (2b)

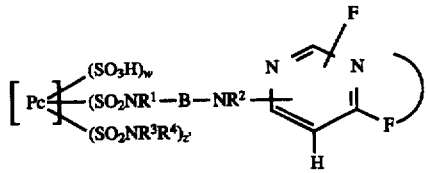

(2b)

in which

Pc=the radical of a copper phthalocyanine or nickel phthalocyanine,

B=an optionally substituted arylene, aralkylene or optionally substituted alkylene bridge or a direct bond, $R^1, R^2, R^3, R^4$=independently of one another hydrogen or an optionally substituted alkyl or aryl radical w=a number from 0 to 3 z'=a number from 0.5 to 2.0 v=a number from 0.5 to 2.5 and in which w+z'+v=3.0 to 4.0 and of the formula (2c)

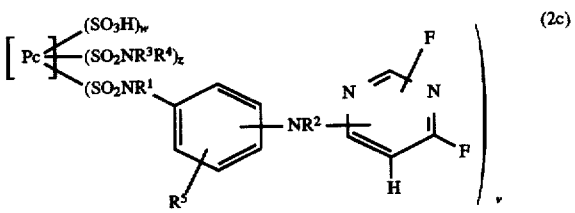

(2c)

in which w, v, z, $R^1$, $R^2$, $R^3$, $R^4$ have the meanings given under formula 2a) and $R^5$ is H, $CO_2H$, $SO_3H$, $CH_3$ or $OCH_3$.

Particularly preferred phthalocyanine reactive dyestuffs 2b are those of the formulae 2.1, 2.2 and 2.3.

Padding process

EXAMPLE 1

100 parts of desized and bleached cotton woven goods are impregnated with a liquor pick-up-of 65% with an aqueous dye liquor which comprises, dissolved in 1000 parts, 2 parts of a commercially available wetting agent 15 parts of the dyestuff 1.1 (were x=about 1.5–2 and y=about 1.3–1.8)

15 parts of the dyestuff 2.1

50 parts of water-glass of specific gravity 1.5 and 7.5 parts of sodium hydroxide solution of specific gravity 1.5.

The temperature of the liquor is 25° C. The web of fabric impregnated with the dye liquor is wound up, packed in polyethylene film and batched for 24 hours under slow rotation. It is then washed out on an eight-box continuous open-width washing machine in accordance with the following plan. Rinse cold twice, rinse warm twice, extract at the boil twice, rinse warm, rinse cold.

A level, clear turquoise blue dyeing with good fastness properties is obtained.

EXAMPLE 2

1000 parts of desized and bleached cotton woven goods are impregnated with a liquor pick-up of 65% with an aqueous dye liquor which comprises, dissolved in 1000 parts, 2 parts of a commercially available wetting agent 38.5 parts of the dyestuff 1.1 (x=about 1.5–2 and y=about 1.3–1.8)

38.5 parts of the dyestuff 2.1

11.5 parts of the dyestuff 4

11.5 parts of the dyestuff 8

100 parts of urea 150 parts of water-glass of specific gravity 1.5 and 154 parts of sodium hydroxide solution of specific gravity 1.5.

The temperature of the liquor is 25° C. The web of fabric impregnated with the liquor is wound up, packed in polyethylene film and batched for 48 hours under slow rotation. It is then washed out on an eight-box continuous open-width washing machine in accordance with the following plan: Rinse cold twice, rinse warm twice, extract at the boil twice, rinse warm, rinse cold.

A deep green dyeing which is level over the surface and the same at the ends and has good fastness properties is obtained.

EXAMPLE 3

1000 parts of boiled-off and bleached cotton woven goods are impregnated with a liquor pick-up of 65% with an aqueous dye liquor which comprises, dissolved in 1000 parts, 12.5 parts of the dyestuff 1.3

12.5 parts of of the dyestuff 2.2

7.5 parts of the dyestuff 5

7.5 parts of the dyestuff 9

12 parts of sodium carbonate, anhydrous, and 8 parts of sodium hydroxide solution of specific gravity 1.356.

The temperature of the padding liquor is 25° C. The web of fabric impregnated with the dye liquor is wound up, packed in polyethylene film and batched for 48 hours under slow rotation. It is then washed out on an eight-box continuous open-width washing machine in accordance with the following plan: Rinse cold twice, rinse warm twice, extract at the boil twice, rinse warm, rinse cold.

A deep green dyeing which is level over the surface and the same at the ends and has good fastness properties is obtained.

EXAMPLE 4

1000 parts of desized and bleached cotton woven goods are impregnated with a liquor pick-up of 75% with an aqueous dye liquor which comprises, dissolved in 1000 parts, 2 parts of a commercially available wetting agent 12 parts of the dyestuff 1.2

12 parts of the dyestuff 2.1

4 parts of the dyestuff 4

4 parts of the dyestuff 8

10 parts of a commercially available polyacrylate thickener and 3 parts of m-nitrobenzenesulfonate.

The temperature of the liquor is 30° C. The web of goods then passes through a chemical pad. The aqueous chemical padding bath comprises, in 1000 parts, 250 parts of sodium chloride and 20 parts of sodium hydroxide solution of specific gravity 1.5.

After the chemical padding bath, the web of goods is transferred to a high-speed steamer and steamed at 106° C. for 60 seconds. Thereafter, it is washed out on an eight-box washing machine in accordance with the plan described:

rinse cold twice, rinse warm twice, extract at the boil twice, rinse warm, rinse cold.

A level green dyeing with good fastness properties is obtained.

Exhaustion process

EXAMPLE 5

100 parts of bleached cotton knitted goods and 3 parts of a phthalocyanine reactive dyestuff mixture are added to 1000 parts of an aqueous dye liquor on a winch vat at 60° C. The mixture comprises in each case 1.5 parts of the dyestuff 1.1 (x=about 1.5–2 and y=about 1.3–1.8) and 1.5 parts of the dyestuff 2.1.

After the dyestuff mixture has spread uniformly in the liquor and on the cotton within a period of 15 minutes, 50 parts of sodium chloride are added to the dye liquor over a period of 30 minuites, and 10 parts of sodium carbonate are then added in 3 portions of 1 part, 2 parts and 7 parts at intervals of 10 minutes. The liquor is then heated to 80° C. in the course of 30 minutes and the goods are treated at this temperature for 30 minutes. Thereafter, the liquor is drained off and the goods are rinsed twice at 60° C. and twice at 80° C. They are subsequently extracted at the boil for 15 minutes and the wash liquor is drained off. After rinsing cold, a level turquoise dyeing with good fastness properties is obtained.

The appearance of the goods of the resulting dyeing is more level than the appearance of the goods of a dyeing obtained in accordance with the same dyeing plan, in which in each case 3 parts of only dyestuff 1 or dyestuff 2 were employed.

EXAMPLE 6

100 parts of cotton knitted goods and 40 parts of sodium chloride are added to 800 parts of an aqueous dye liquor on a commercially available jet dyeing unit at 30° C.

After treatment at this temperature for 10 minutes, the liquor is heated to 60° C. in the course of 15 minutes, and 100 parts of a dyestuff solution comprising 1 part of a mixture of 0.7 part of the dyestuff 1.2

0.3 part of the dyestuff 2.1 and 2 parts of the dyestuff of the formula 4.1 are added over a period of 45 minutes.

10 parts of sodium carbonate, anhydrous, dissolved in 100 parts of water, are then added over a period of 45 minutes. After 15 minutes, the liquor is heated to 80° C. in the course of 20 minutes and the goods are treated at this temperature for 30 minutes.

Thereafter, the liquor is drained off and the goods are rinsed twice at 60° C. and twice at 80° C. They are then soaped at the boil for 15 minutes and the wash liquor is drained off After rinsing cold, a level green dyeing with good fastness properties is obtained.

The appearance of the goods is more level than the appearance of the goods of a dyeing obtained in accordance with the same dyeing plan in which in each case instead of the .mixture of dyestuff 1 and 2, 1 part of the dyestuff 1 or 1 part of the dyestuff 2 was employed.

EXAMPLE 7

100 parts of a bleached cotton yarn are treated on a commercially available yarn dyeing apparatus at a liquor circulation of 27 l/kg/minute with 750 parts of a dye liquor, heated to 60° C., which comprises 40 parts of sodium sulfate (anhydrous)

10 parts of sodium carbonate (anhydrous)

3 parts of a dyestuff mixture comprising:

60 parts of the dyestuff 1.3

40 parts of the dyestuff 2.1 and 2 parts of the dyestuff of the formula 8.

The bath is heated to 80° C. in the course of 20 minutes and kept at this temperature for 60 minutes. After this period, the liquor is drained off and the goods are rinsed twice with 750 parts of a liquor heated to 60° C. Thereafter, the bath is topped up with 750 parts of a fresh liquor heated to 60° C., 0.5 parts of a 60% strength acetic acid is added and the liquor is heated to 80° C. After treatment at this temperature for 10 minutes, the liquor is drained off, the bath is topped up to the same volume with fresh liquor of 60° C. and the liquor is brought to 95° C. After treatment at this temperature for 15 minutes, the liquor is drained off and the goods are rinsed cold with an overflow.

A level deep green dyeing is obtained.

EXAMPLE 8

100 parts of bleached cotton woven goods are treated on a commercially available short liquor jet-dyeing unit with 500 parts of a dye liquor, heated to 60° C., which comprises

- 30 parts of sodium chloride
- 10 parts of sodium carbonate (anhydrous)
- 4 parts of the dyestuff mixture comprising
    - 50 parts of the dyestuff 1.1 (x=about 1.5–2 and y=about 1.3–1.8)
    - 50 parts of the dyestuff 2.1
- 0.5 part of the dyestuff of the formula

EXAMPLE 9

100 parts of bleached cotton mesh goods are treated on a commercially available jet-dyeing unit with 800 parts of a dye liquor, heated to 60° C., which comprises

- 40 parts of sodium chloride
- 10 parts of sodium carbonate (anhydrous)
- 4 parts of the dyestuff mixture comprising
    - 50 parts of the dyestuff 1.1 (x=about 1.5–2 and y=about 1.3–1.8)
    - 35 parts of the dyestuff 2.1 and
    - 15 parts of the dyestuff 2.2
- 0.5 part of the dyestuff of the formula

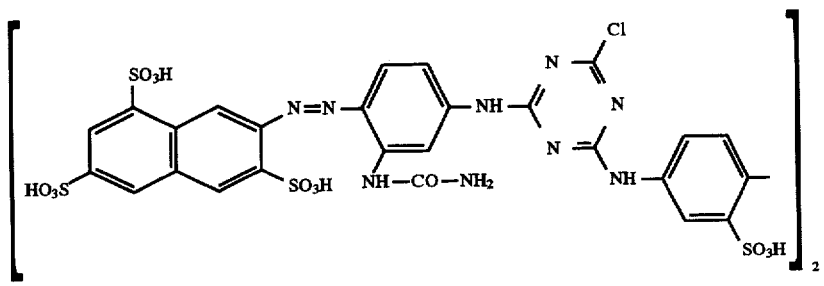

and
0.5 part of the dyestuff of the formula

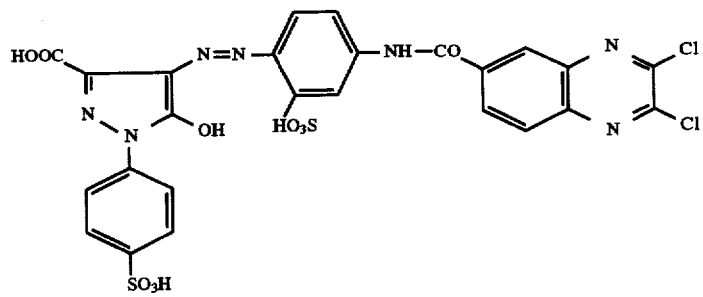

The bath is heated to 80° C. in the course of 20 minutes and kept at this temperature for 60 minutes. After this period, the liquor is drained off and the goods are rinsed twice for 10 minutes each time with 800 parts of a liquor heated to 60° C. and twice with 800 parts of a liquor heated to 80° C.

The goods are then heated to 95° C. with fresh liquor and extracted at the boil for minutes. After the wash liquor has been drained off, the goods are rinsed cold.

A level green dyeing with good fastness properties is obtained.

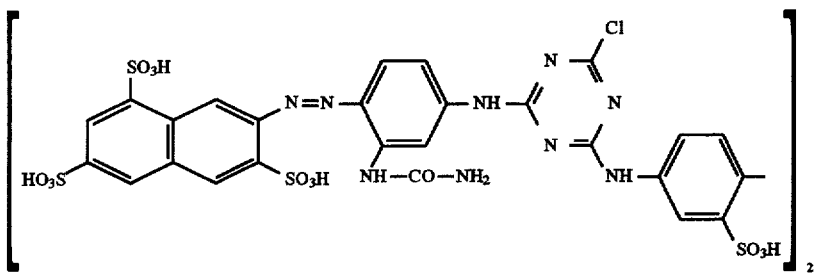

and
0.5 part of the dyestuff of the formula

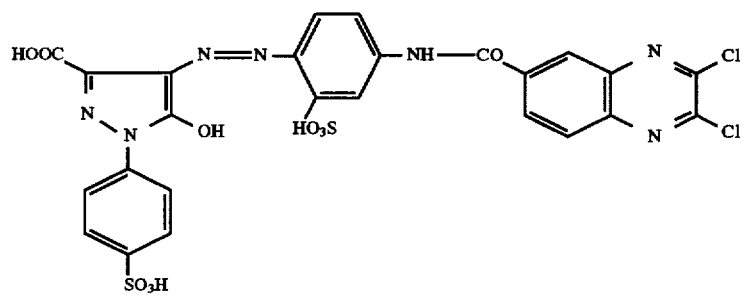

The bath is heated to 80° C. in the course of 20 minutes and kept at this temperature for 60 minutes. After this period, the liquor is drained off and the goods are rinsed twice for 10 minutes each time with 800 parts of a liquor heated to 60° C. and twice with 800 parts of a liquor heated to 80° C.

The goods are then heated to 95° C. with fresh liquor and extracted at the boil for 20 minutes. After the wash liquor has been drained off, the goods are rinsed cold.

A level green dyeing with good fastness properties is obtained.

EXAMPLE 10

59.4 parts of copper phthalocyanine, 97% pure, are stirred in 310 parts of chlorosulfonic acid at 136° C. to 138° C. for 8 hours and, after addition of 35 parts of thionyl chloride, the mixture is stirred at 90° to 92° C. for a further 4 hours. The reaction mixture is poured onto ice and washed.

The material on the suction filter is stirred with 1000 parts of ice-water. 40 parts of a mixture of 2,4-difluoro-6-(3-aminophenyl)aminopyrimidine (content of about 80%) and 4,6-difluoro-2-(3-aminophenyl)aminopyrimidine (content of about 20%), which is obtained by reaction of equimolar mounts of 1,3-diaminobenzene and 2,4,6-trifluoropyrimidine, and 5.9 parts of ammonium chloride are then added. The pH is brought to 6.0 to 6.5 with dilute sodium hydroxide solution at 0° to 5° C. and is kept at this value for 3 hours. The pH is then increased to 9.5 to 10.0 and, after a subsequent stirring time of two hours, the temperature is allowed to rise to 20° to 25° C. After the mixture has been stirred at 20° to 25° C. for 10 hours, the pH is brought to 7 with dilute hydrochloric acid and the dyestuff is salted out with sodium chloride.

The dyestuff is filtered off with suction and dried at 60° C. in vacuo. The dyestuff essentially corresponds, in the form of its free acid, to the formula

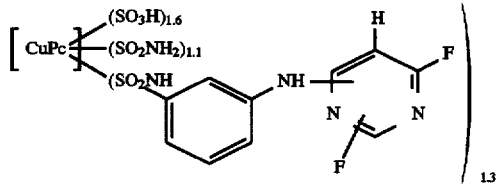

and dyes cotton in clear turquoise blue shades and gives a turquoise blue print on cotton.

EXAMPLE 11

If the procedure is as in Example 10 but the addition of ammonium chloride is omitted, a dyestuff of the formula

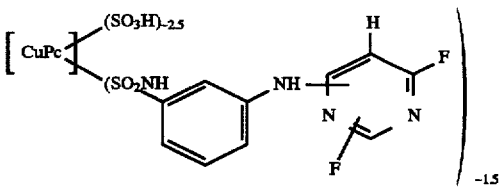

which likewise dyes cotton in clear turquoise blue shades results.

The degree of sulfonation and the content of sulfonamide groups in the dyestuffs of Examples 10 and 11 can be controlled in a known manner by slight variation of the sulfochlorination conditions.

EXAMPLE 12

A turquoise dyestuff for reactive printing which is particularly readily water-soluble and has the formula

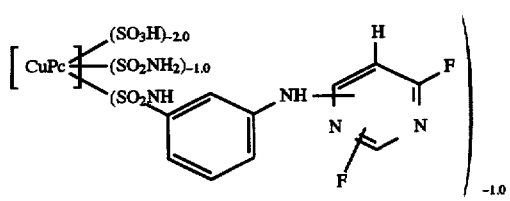

is obtained if the amount of acylated 1,3-diaminobenzene and ammonium chloride in Example 10 are reduced by about 10%.

If another aromatic diamino compound is chosen instead of 1,3-diaminobenzene, the following turquoise blue reactive dyestuffs are obtainable analogously to the instructions of Examples 10 to 12:

Example 13:

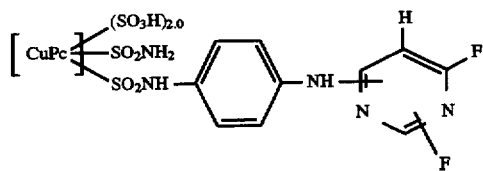

Example 14:

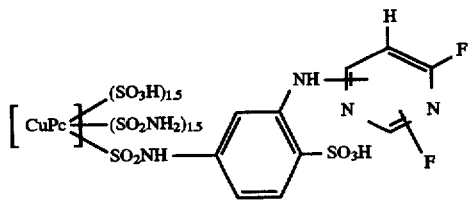

Example 15:

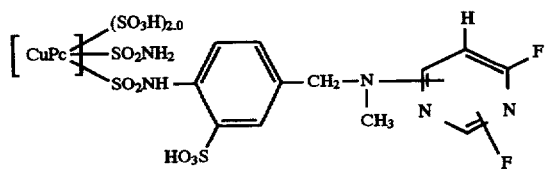

Example 16:

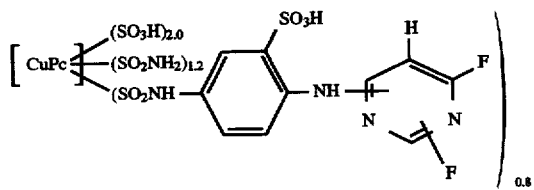

EXAMPLE 17

The reactive dyestuffs of Examples 10 to 12 can also be prepared by reacting 0.1 mol of a dyestuff intermediate product of the formula

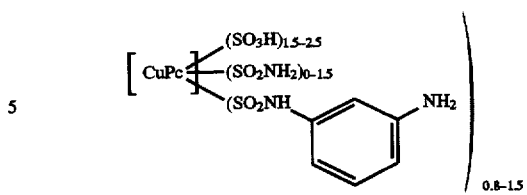

with 0.08–0.15 mol of 2,4,6-trifluoropyrimidine in 250 ml of water at 40°–50° C. During this reaction, the pH is kept constant at 6.5 by addition of sodium carbonate solution. After about 3 hours, the condensation reaction has ended. The resulting dyestuff is salted out with potassium chloride, isolated by filtration with suction and dried.

The dyestuff intermediate product employed, the color base outlined above, is obtained by condensation of copper phthalocyanine-sulfonyl chloride with 3-aminoacetanilide and, if appropriate, ammonium chloride and subsequent hydrolysis of the N-acyl grouping.

EXAMPLE 18

Starting from the phthalocyanine color base of the formula

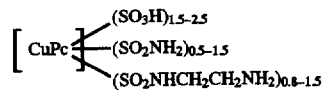

and 2,4,6-trifluoropyrimidine, reactive dyestuffs of the formula

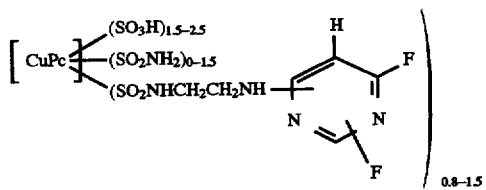

which dye cotton in clear turquoise blue shades are obtained analogously to the instructions of Example 17.

The following turquoise blue reactive dyestuffs are obtainable by variation of the aliphatic diamino compound in the preparation of corresponding color bases:

Example 19:

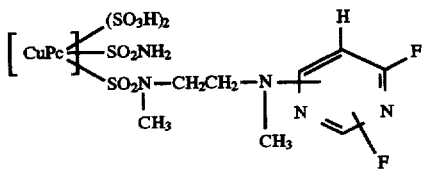

Example 20:

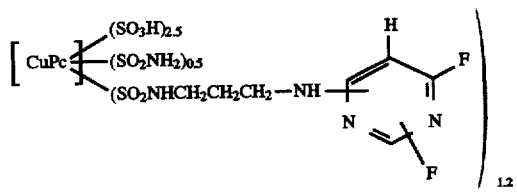

Example 21:

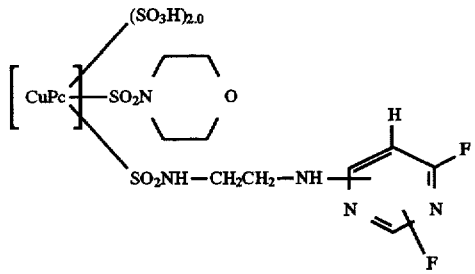

Example 22:

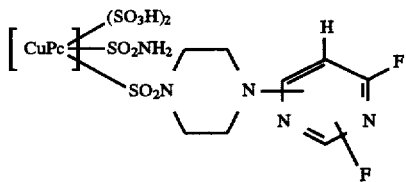

Example 23:

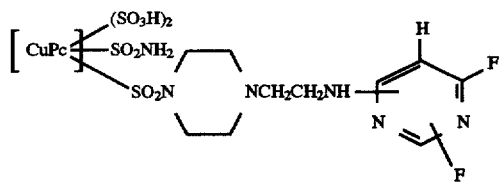

EXAMPLE 24

57.5 parts of nickel phthalocyanine, 99% pure, are stirred in 257 parts of chlorosulfonic acid at 136° to 138° C. for 8 hours. The melt is cooled to 25° and—if appropriate after dilution with a little chlorosulfonic acid—is poured onto ice, during which the temperature should not exceed +3°. The suspension is filtered off with suction and washed with 1600 parts of ice-water, to which 150 parts of hydrochloric acid, 30% strength, are added.

The material on the suction filter is stirred into 1000 parts of ice-water. 26.5 parts of a mixture of 2,4-difluoro-6-(3-aminophenyl)aminopyrimidine (content about and 4,6-difluoro-2-(3-aminophenyl)aminopyrimidine (content about 20%) (for the preparation, see Example 10) are stirred in.

The pH of the suspension is brought to 9.0 in the course of 90 minutes by addition of sodium hydroxide solution, the temperature being increased to 23° C. at the same time. The mixture is stirred at pH 9 and 20° to 24° C. until the reaction has ended. The dyestuff is salted out, subsequently stirred briefly at pH 7, filtered off with suction and covered several times with dilute NaCl solution. The dyestuff is dried at 60° C. As the free acid, it corresponds to the formula

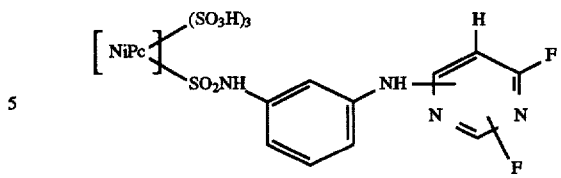

The dyestuff dyes cotton in bluish-tinged green shades which are extremely fast to washing and light, the optimum dyeing temperature being 80° C.

We claim:

1. A dye mixture comprising at least two phthalocyanine reactive dyestuffs which contain different reactive groups, which comprises at least one chlorine-free phthalocyanine-fluoropyrimidinyl reactive dyestuff 2 and at least one phthalocyanine sulfatoethyl sulfonyl reactive dyestuff 1 or one phthalocyanine-monochlorotriazinyl reactive dyestuff 3, or both.

2. A dyestuff mixture as claimed in claim 1, wherein the dyestuff 2 corresponds to the formula (2a)

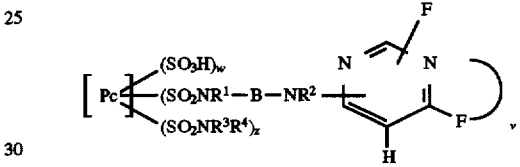

in which

Pc=the radical of a copper phthalocyanine or nickel phthalocyanine,

B=unsubstituted o-, m- and p-phenylene, o-, m- or p-phenylene which is substituted by $CH_3$, $SO_3H$ or $CO_2H$, ethylene, propylene, —$CH_2$—$CH(CH_3)$—, —$(CH_2)_4$—, —$(CH_2)_5$—,

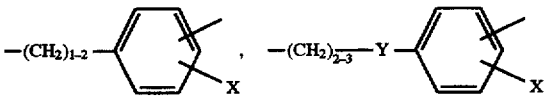

in which

X=H, $CH_3$, $CO_2H$ or $SO_3H$

Y=O, S or $NR^1$, or

B is a direct bond, $R^1$, $R^2$, $R^3$, $R^4$=independently of one another represent hydrogen or unsubstituted $C_1$–$C_4$-alkyl or $C_1$–$C_4$-alkyl which is substituted by OH, $SO_3H$, $OSO_3H$ or $CO_2H$ or represent unsubstituted phenyl or phenyl which is substituted by OH, $SO_3H$ or $CO_2H$, and in which —$NR^1$—B—$NR^2$— can also be

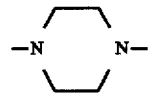

and

—NR³R⁴ can also be

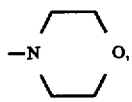

and w, z=independently of one another a number from 0 to 3 v=a number from 0.5 to 2.0.

3. A dyestuff mixture according to claim 1, wherein the phthalocyanine sulfatoethyl sulfonyl reactive dyestuff 1 corresponds to one of the formulae

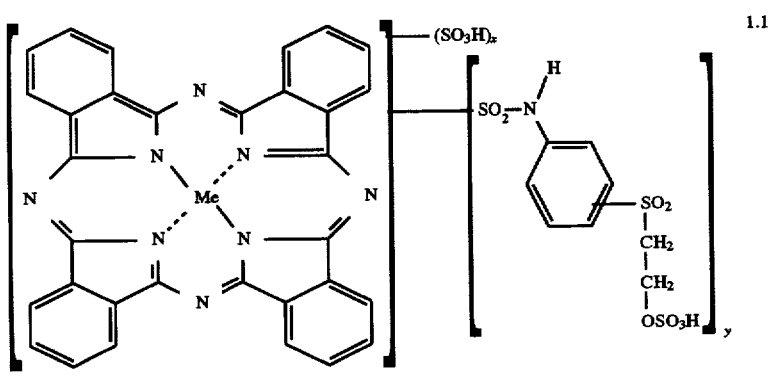

in which

Me=a metal atom, x=1 to 3, y=1 to 3 and x+y=about 3 to 4

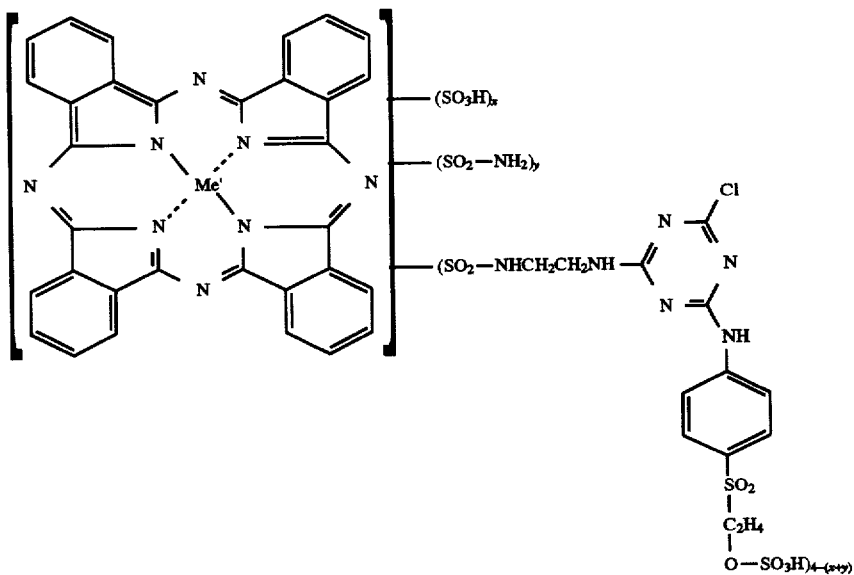

where x=0.8 to 1.5 y=0.2 to 0.5 and the phthalocyanine-fluoropyrimidine reactive dyestuff 2 corresponds to one of the formulae

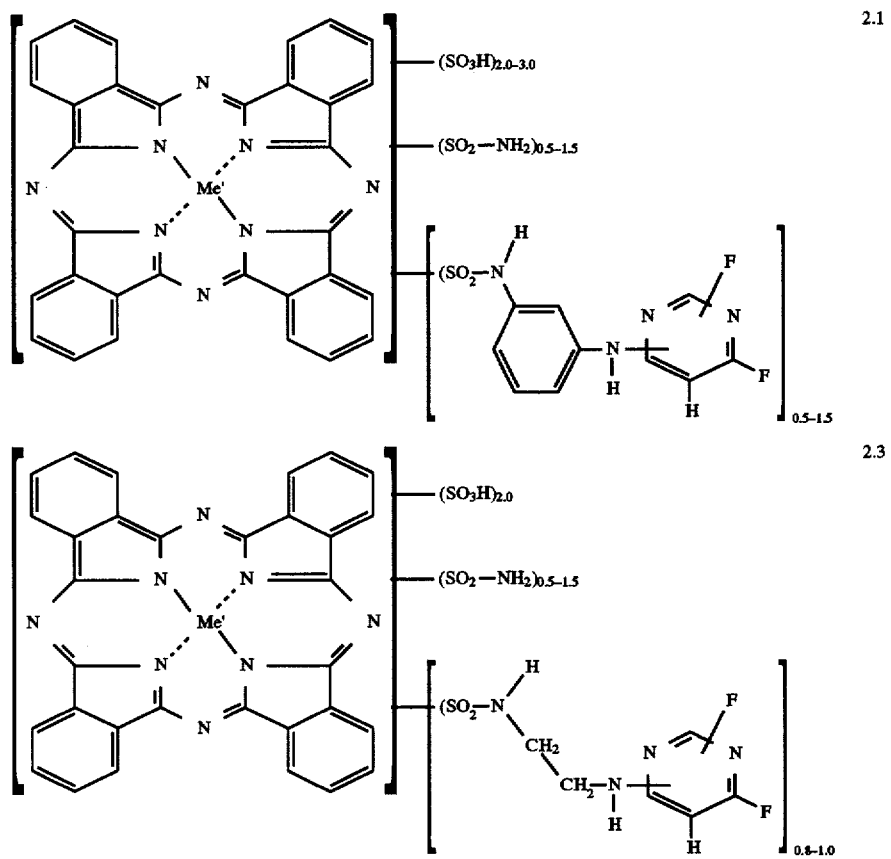
and the phthalocyanine-monochlorotriazinyl reactive dyestuff 3 corresponds to one of the formulae
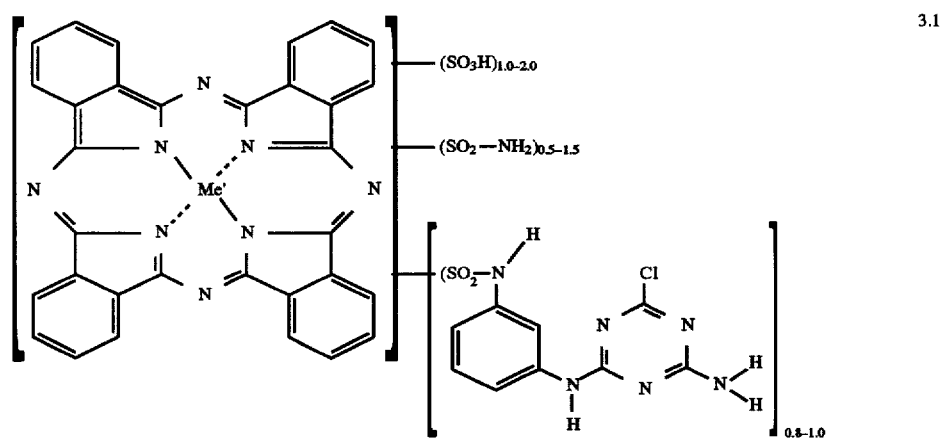

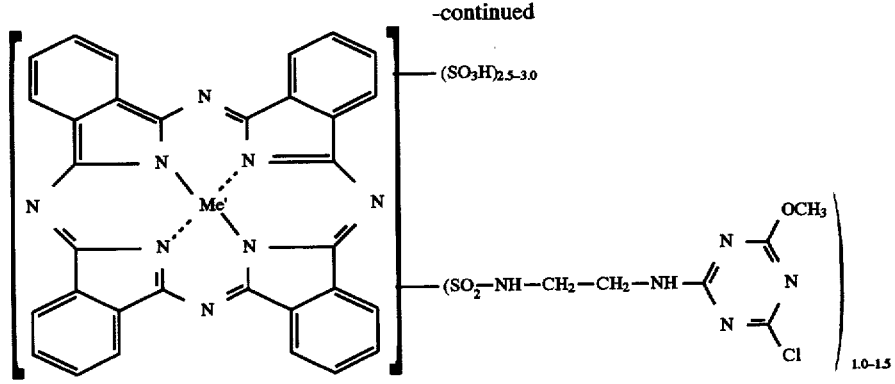

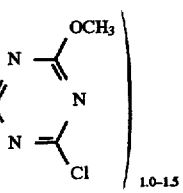

where

Me'=Cu or Ni, independently of one another if they occur two or more times, and in which the numbers stated for the substituents are in each case statistical mean values.

4. A dyestuff mixture as claimed in claim 1, wherein the mixture comprises 30 to 70% by weight of the dyestuff 1, 30 to 70% by weight of the dyestuff 2 and 0 to 70% by weight of the dyestuff 3, based on the total dyestuff content.

5. A dyestuff mixture as claimed in claim 1, which further comprises, per part of dyestuff, up to 50 parts of an inorganic salt and a buffer which produces a buffering range between pH 6.5 and 7.5.

6. A dyestuff mixture as claimed in claim 1, wherein the mixture further comprises 0.5 to 10 parts by weight of an organic, anionic dispersing agent and 0.5 parts by weight of a dust removal agent, in each case based on the total mixture.

7. A process for dyeing cellulose fibers or cellulose mixed fibers with a mixture of reactive dyestuffs, which comprises applying to said fibers a mixture as claimed in claim 1.

8. The process as claimed in claim 7, wherein dyeing is carried out by the cold pad-batch process, the pad-steam process or the exhaustion process.

9. A dyestuff mixture as claimed in claim 1, which comprises, in addition to the phthalocyanine reactive dyestuff mixture, a reactive yellow dyestuff mixture which comprises at least one or more of the following dyestuffs 4 to 6:

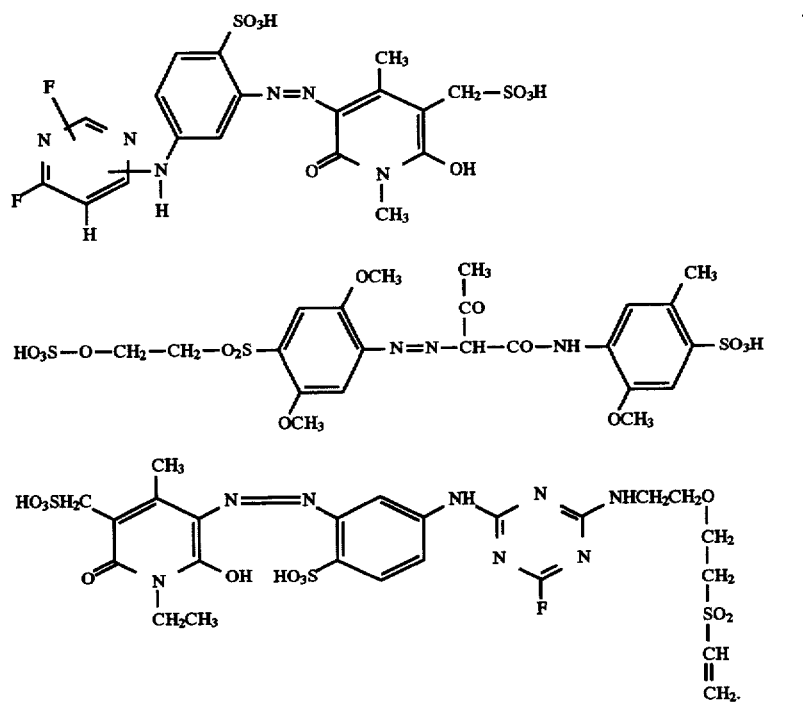

10. A dyestuff mixture as claimed in claim 1, which comprises, in addition to the phthalocyanine reactive dyestuff mixture, a reactive yellow dyestuff mixture which comprises at least one of the dyestuffs 7 to 9:

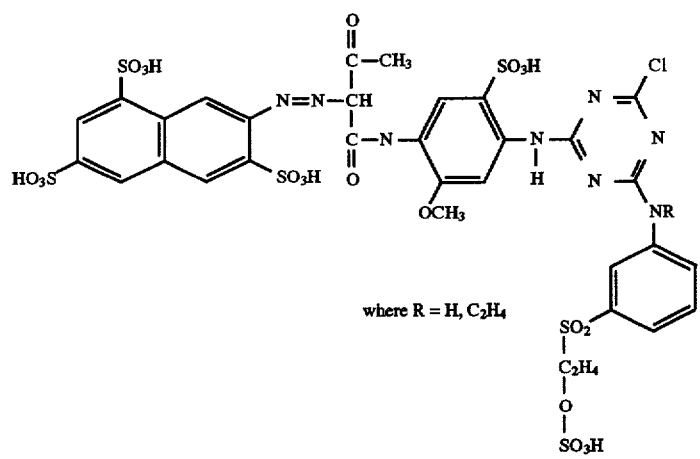
7
where R = H, C₂H₄
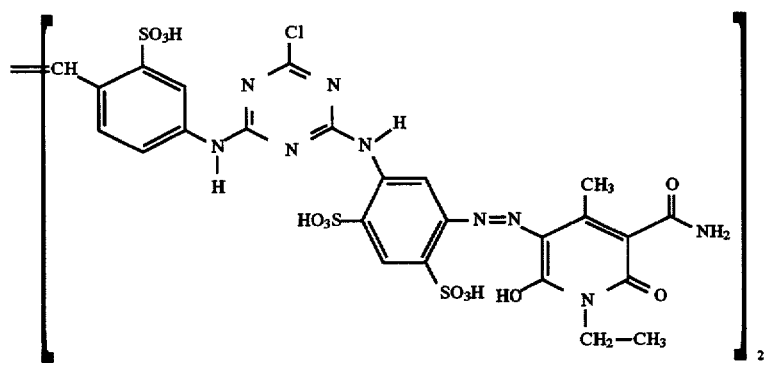
8
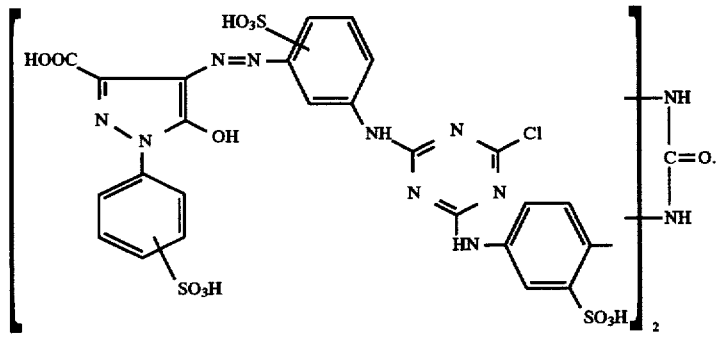
9
11. A textile which comprises cellulose or regenerated cellulose fibers which have been dyed with a reactive dyestuff mixture as claimed in claim 1.
* * * * *